United States Patent [19]

Scott et al.

[11] Patent Number: 5,044,748
[45] Date of Patent: Sep. 3, 1991

[54] COLLIMATOR GUN SIGHT

[75] Inventors: Fraser Scott, Guildford; Raymond G. Budden, Havant, both of England

[73] Assignee: Ring Sights International Limited, Monrovia, Liberia

[21] Appl. No.: 562,871

[22] Filed: Apr. 30, 1990

[30] Foreign Application Priority Data

May 4, 1989 [GB] United Kingdom ............... 8910204

[51] Int. Cl.⁵ ............................................. G02B 23/10
[52] U.S. Cl. ...................................... 356/251; 33/241
[58] Field of Search ............... 356/251, 252, 253, 254, 356/255; 33/241–243, 245, 251, 261

[56] References Cited

U.S. PATENT DOCUMENTS 3,880,529 4/1975 Althause et al. ..................... 356/251
4,390,276 6/1983 Budden et al. ....................... 356/251

FOREIGN PATENT DOCUMENTS 2056634 3/1981 United Kingdom ............... 356/251

Primary Examiner—F. L. Evans
Attorney, Agent, or Firm—Schrivener and Clarke

[57] ABSTRACT

The sight is of the type in which a virtual image of a graticule pattern (3) is made to overlie the view of a target through the sight along a viewing axis of the sight. The sight has an optical arrangement with a single composite graticule pattern having a light transmissive component and a light reflective component. The composite graticule pattern may be illuminated by light from the sky above the target or by the light from an artificial source to give a virtual image of at least a part of the single graticule pattern. Thus an artificial light source may be permanently mounted to the sight, to allow a daylight reflective graticule to be used during daylight and a transmissive graticule to be used at night time. During the day superimposed images of both graticule patterns may be viewed.

7 Claims, 2 Drawing Sheets

COLLIMATOR GUN SIGHT

This invention relates to collimator gun sights, and more particularly, to such sights in which a virtual image of a graticule pattern is made to overlie the view of a target through the sight.

Previous gun sights of this type disclosed in U.S. Pat. No. 4,390,276 and G.B. patents nos. 2,049,118 and 2,056,634 have each sought to provide a brightly illuminated image of the graticule, variously using incident light from the target area, from the sky above or from an adjacent artificial light source. For optimum brightness of the image during daytime the light from the target is preferably supplemented by light from the sky. This may be achieved either by using prism means to diffract light from the sky to a reflective graticule pattern buried within the sight, as in G.B. 2,056,634, or by having the light of the sky pass through a transmissive graticule pattern mounted atop the sight, as in our co-pending application no. 8,902,687.6. Furthermore it is valuable for night use of the sight to be able to illuminate a graticule by artificial light source means. One arrangement for enabling this is simply to mount the artificial light source over the surface mounted graticule so as to transmit light therethrough. Whilst this may provide a graticule image enhanced using light from the sky or from an artificial source, it cannot make use of both sources simultaneously.

At some times it may also be advantageous for daylight to illuminate both a reflective graticule pattern and a transmissive graticule pattern to give an improved image of the graticule.

It is an object of the present invention to enable two or more sources to be used simultaneously, illuminating one or more graticule patterns on the same graticule. In this manner an artificial light source may be permanently mounted to the sight, to allow a daylight reflective graticule to be used during daylight and a transmissive graticule to be used at night time. During the day superimposed images of both graticule patterns may be viewed.

According to the present invention there is provided a collimator gun sight of the type in which a virtual image of a graticule pattern is made to overlie the view of a target through the sight along a viewing axis of the sight, which sight is characterised by an optical arrangement, whereby a single composite graticule pattern having a light transmissive component and a light reflective component, may be illuminated by light from the sky above the target or by light from an artificial source to give a virtual image of at least a part of the single graticule pattern.

Prism means may serve to direct light from the sky above the target to the composite graticule pattern to be reflected by the light reflective component thereof.

Second prism means may also serve to direct light from the sky above the sight to the composite graticule pattern to be transmitted through the light transmissive component thereof.

Artificial light source means may be provided adjacent the composite graticule to transmit light through the light transmissive component of the composite graticule.

The light from the artificial light source may either pass directly to the graticule or be internally reflected by said second prism means.

It is further preferred that the composite graticule be located at an end of the sight facing the user, and below the viewing axis of the sight.

It is also preferred that the first mentioned prism means be located at an end of the sight facing the target, and below the viewing axis of the sight.

The second prism means may be located adjacent the graticule. It may allow daylight to fall on the light or reflective source for illuminating, reflecting or exciting the light source.

Embodiments of the invention will now be more particularly described with reference to the accompanying drawings in which.

Figure 1:
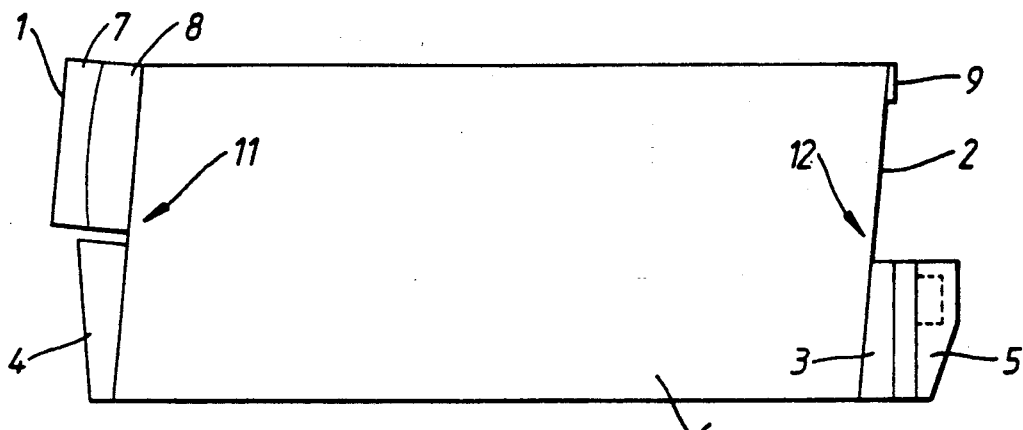
FIG. 1 is a side elevation of one embodiment of gun sight.
Figure 2:
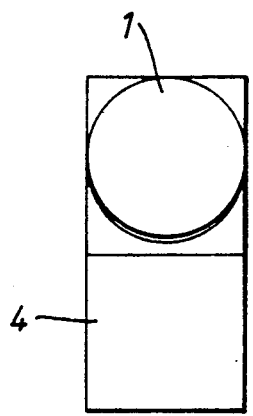
FIG. 2 is an end elevation of the gun sight of FIG. 1 as viewed from the target direction.
Figure 3:
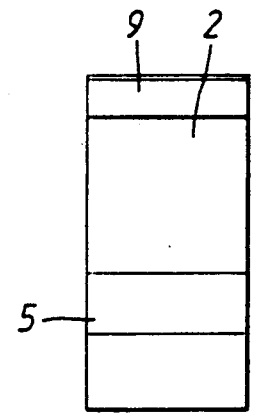
FIG. 3 is an end elevation of the sight as viewed by the user.
Figure 4:
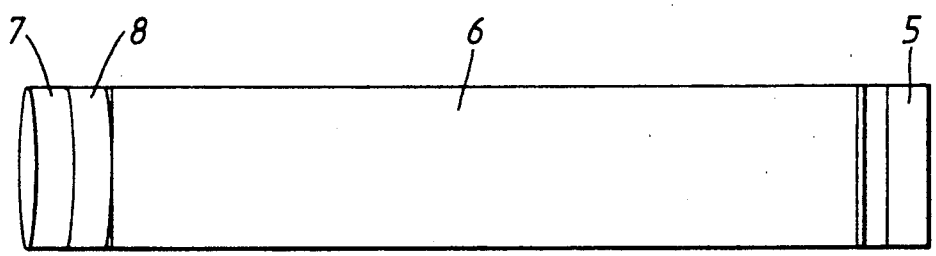
FIG. 4 is a plan view of the sight.

As illustrated in FIGS. 1 to 4 the sight comprises a block 6 of transparent material, preferably glass, having an opaque coating, preferably of black epoxy paint, covering the external faces of the block 6 except for userward and targetward faces 12 and 11, respectively. Faces 11 and 12 are parallel one to the other and angled slightly to the line of sight such that light entering the sight from the target may still pass relatively undeviated to a viewing aperture 2 on face 12, whilst light may also be directed toward a graticule 3 mounted to the userward face 12 below, in use, the viewing aperture 2. Light from the target enters the sight through a partially reflective lens doublet 1 affixed to the targetward face 11. The lens doublet 1, comprising a planoconcave lens 7 and a correspondingly curved planoconvex lens 8, is a characteristic feature of collimator gun sights of the type to which this invention pertains, enabling an image of the graticule 3 to be reflected thereby as a virtual image within the line of sight and apparently at infinity or any predetermined distance. The interface between the two lenses should ideally have an outward light transmission of between 20 and 25%.

Since the graticule 3 is mounted parallel to the angled userward face of the block 6, light reflected thereby passes to the partially reflective lens doublet 1 to form a virtual image of the graticule in the line of sight.

A prism 4 is mounted to the targetward face 11 of the sight adjacent and below, in use, the lens doublet 1, and with the apex of the prism farthest from the lens doublet 1. The prism 4 serves to direct light from the sky above the target to the graticule 3 to enhance the brightness of the virtual image of the graticule 3.

Artificial illumination is provided by an artificial light source such as a betalight 5 mounted to the exterior of the graticule 3 such that light passing through the graticule may also form a virtual image on reflection by the partially reflective lens doublet 1.

Figure 5:
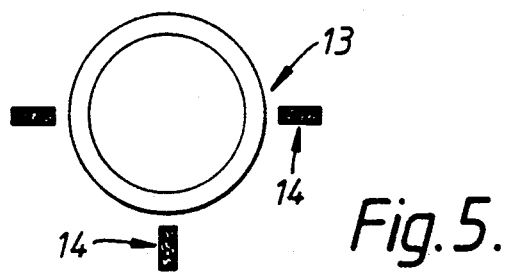
FIG. 5 illustrates one example of composite day and night graticule pattern for use with sights embodying the invention.
Figure 6:
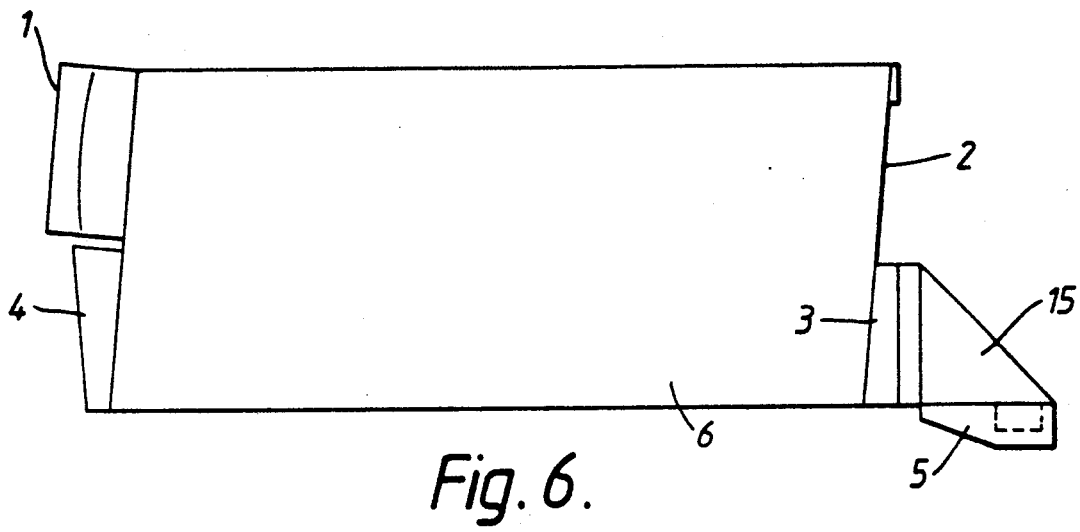
FIG. 6 is a side elevation of an alternative embodiment of gun sight.
Figure 7:
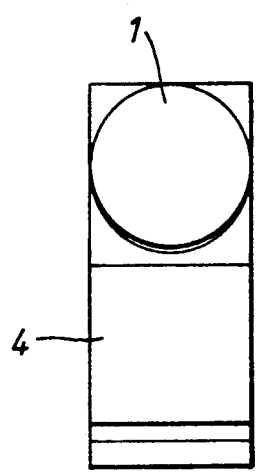
FIG. 7 is an end elevation of the gun sight of FIG. 6 as viewed from the target direction.
Figure 8:
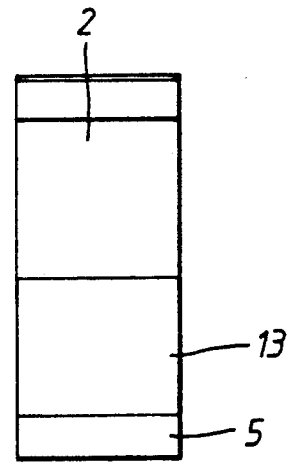
FIG. 8 is an end elevation of the sight as viewed by the user.
Figure 9:
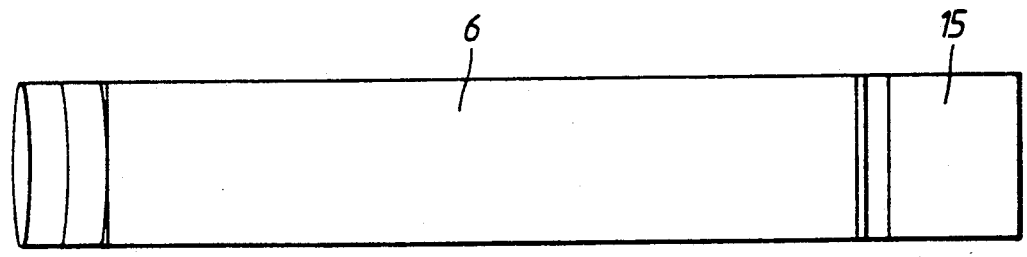
FIG. 9 is a plan view of the sight of FIG. 6.

In order that either one of the alternative light sources may be used to produce a reasonably intense virtual image of the graticule 3, the graticule 3 comprises two discrete patterns such as illustrated in FIG. 5. A daylight responsive graticule pattern 13 is reflective, being formed preferentially by an aluminium or other type of film. Another graticule pattern 14 is transmissive, being formed by apertures in a coated surface. A composite graticule such as shown in FIG. 5 will show to the user of the sight during daylight hours predominantly the reflective graticule pattern. At night the predominant graticule image will be that of the transmissive graticule pattern 14.

In an alternative embodiment of the present invention, illustrated in FIGS. 6 to 9, the transmissive graticule pattern 14 may be illuminated additionally during daylight hours by light from the sky. In the arrangement of FIGS. 6 to 9 all features are identical to those of the first embodiment with the exception that a substantially right angled second prism 15 of angles that will provide total internal reflection, is provided between the artificial light source 5 and the graticule 3. A first side of the prism 15 is mounted to the graticule 3. The artificial light source 5 is mounted to a second lower, in use, side of the prism 15 opposite the hypotenuse so as to receive light from the sky. Light is transmitted from the artificial source 5 to the graticule 3, by way of internal reflection from the hypotenuse surface of the prism 15. Light from the sky passing through the hypotenuse of the prism 15 to the artificial light source 5 may also supplement the artificial light emanating from the source 5, by reflection from the external surface of the artificial light source.

Also the phosphor or tritium ions of a betalight may be excited by incident daylight to generate additional light at night. The artificial light source 5 may optionally be replaced by a white or coloured or fluorescent or luminescent surface better to reflect the daylight entering the sight through the hypotenuse of the second prism 15.

We claim:

1. A collimator gun sight of the type in which a virtual image of a graticule pattern is made to overlie the view of a target through the sight along a viewing axis of the sight, the sight comprising a single composite graticule pattern having a light trasmissive component and a light reflective component, a source of artificial light located adjacent to the graticule pattern, means to project said artificial light through the light transmissive component of said graticule pattern, and first prism means to direct ambient light from the target zone to the composite graticule pattern to be reflected by the light reflective component thereof, whereby a virtual image of at least a part of the single composite graticule pattern may be viewed under any conditions.

2. A collimator gun sight as claimed in claim 1, wherein second prism means serve to direct light from the sky above the sight to the composite graticule pattern to be transmitted through the light transmissive component thereof.

3. A collimator gun sight as claimed in claim 2, wherein said second prism means is located adjacent the graticule, to allow daylight to fall on a reflective surface for illuminating the graticule.

4. A collimator gun sight as claimed in claim 2, wherein said second prism means also serve to cause internal reflection of said artificial light source to illuminate the graticule.

5. A collimator gun sight as claimed in claim 4, wherein said second prism means is located adjacent the graticule and allows daylight to fall on the artificial light source for excitation thereof.

6. A collimator gun sight as claimed in claim 1, wherein the composite graticule is located at an end of the sight facing the user, and below the viewing axis of the sight.

7. A collimator gun sight as claimed in claim 1, wherein the first mentioned prism means is located at an end of the sight facing the target, and below the viewing axis of the sight.

* * * * *